(No Model.)
M. L. SENDERLING.
DUMPING WAGON.
No. 565,236. Patented Aug. 4, 1896.
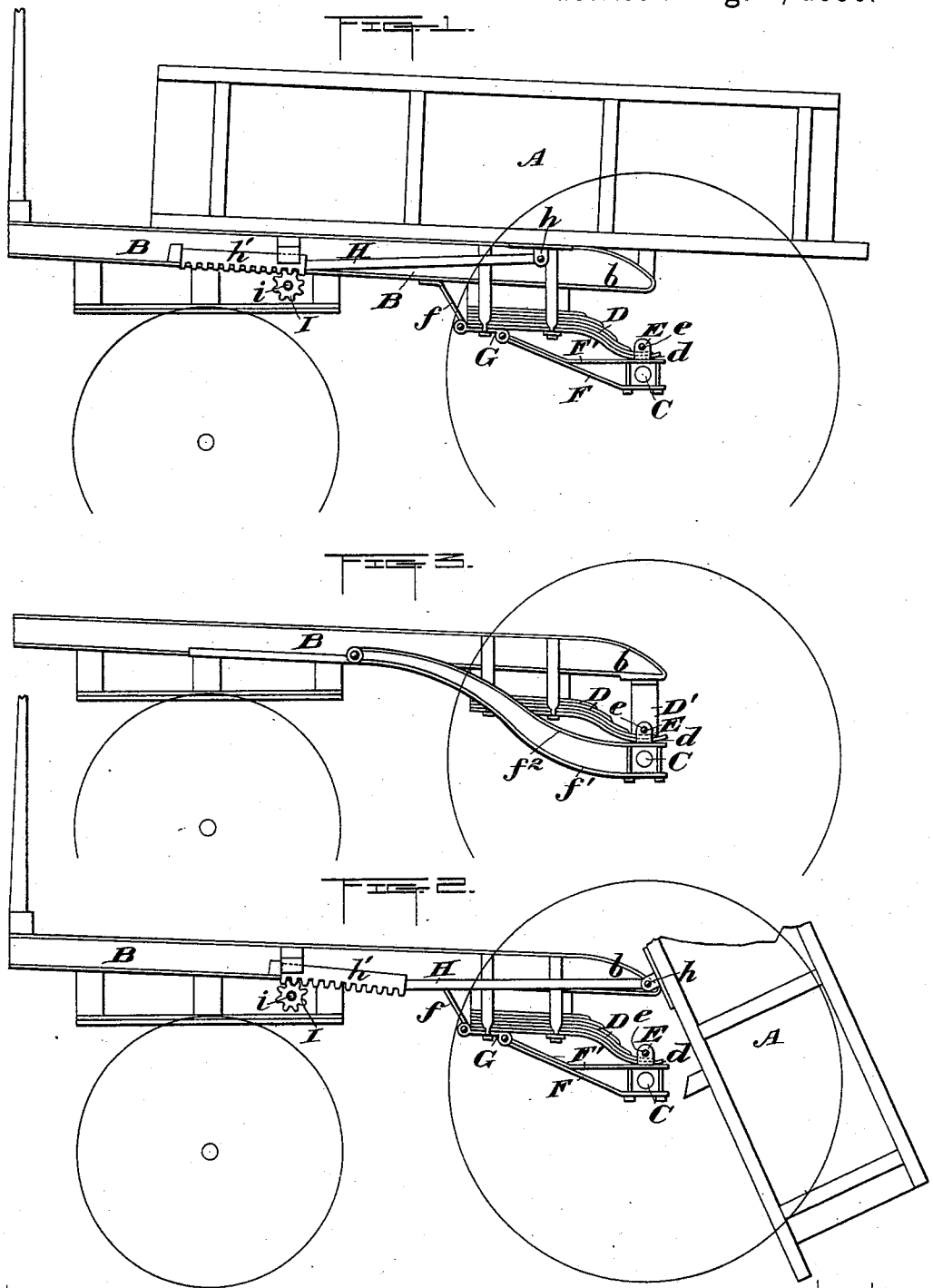
Witnesses.
George Barry,
Inventor
Martin L. Senderling
by attorneys Brown Seward

UNITED STATES PATENT OFFICE.

MARTIN L. SENDERLING, OF JERSEY CITY, NEW JERSEY.

DUMPING-WAGON.

SPECIFICATION forming part of Letters Patent No. 565,236, dated August 4, 1896.

Application filed June 19, 1894. Serial No. 515,028. (No model.)

*To all whom it may concern:*

Be it known that I, MARTIN L. SENDERLING, of Jersey City, in the county of Hudson and State of New Jersey, have invented a new and useful Improvement in Sliding-Body Dump-Wagons, of which the following is a specification.

My invention relates to an improvement in sliding-body dump-wagons in which the side rails are secured to the rear axle by means of suitable braces and are supported upon springs, the rear ends of which have a movable engagement with the rear axle, the body itself being arranged to slide longitudinally along the side rails for the purpose of carrying the load to the rear of the rear axle for dumping.

A practical embodiment of my invention is represented in the accompanying drawings, in which—

Figure 1 is a view of the wagon in side elevation, the position of the wheels being indicated in outline and the parts in the position which they assume when the body is ready to receive its load. Fig. 2 is a similar view showing the position of the body when the load is dumped; and Fig. 3 is a partial view, in side elevation, showing a modified form of connection between the rear axle and the side rails.

The body of the wagon is denoted by A. The side rails are denoted by B, and the rear axle by C. Springs D, consisting of several leaves and having the general form of half of a semi-elliptical spring, are secured to the under side of each of the rails B, one to each, their rear ends $d$ resting in sliding engagement with the rear axle C, preferably within a socket or loop E, which may for convenience be formed by means of a pair of upwardly-extended ears connected by a cross-pin $e$.

The axle C is connected by a pair of double braces, each consisting of a lower section F and an upper section F', with a plate G, which in the present instance is secured to the springs D by means of one of the clips which secure the spring to the side rail, and said plate G is further connected by a short brace $f$ with the rail B. The connections of the braces $f$, F, and F' with the plate G are of a pivotal nature, so as to permit the braces $f$, F, and F' to change their positions with respect to one another to a slight degree as the spring D is depressed under the weight of the load.

In the form shown in Fig. 3 the braces $f'$ $f^2$, which correspond to the braces F, F', and $f$ of Figs. 1 and 2, are extended from the axle C forwardly and upwardly to the side rail B, instead of connecting with an intermediate plate G. They may connect directly or indirectly with the side rails. The rear ends of the side rails B are also here shown as supported upon an additional spring D', resting on the rear axle intermediate of the connection of the springs D therewith.

The side rails B project rearwardly, as shown at $b$, beyond their point of attachment with the spring D' to a point over or slightly to the rear of the rear axle C, and they preferably have their rear ends curved in order to permit the body A to change its fulcrum to the rear during its tilting movement. When in its normal position it is intended that the body A with its load shall have its center of gravity forward of the rear axle at a point, for example, over where the side rails are attached to the spring D. When it is desired to dump the load, the body A is first slid to the rear on the side rails B until the center of gravity begins to rock it on the curved bearings of the side rails, and after it has finally been tilted into its full dumping position (shown in Fig. 2) it is first rocked back toward a horizontal position by pulling downwardly on its forward end and then slid back again into its normal position.

The means which I have herein shown for sliding the body consists of a push-and-pull rod H, pivotally secured to the lower portion of the body, as at $h$, and connected at its forward end with a longitudinally-sliding rack-bar $h'$. The rack-bar $h'$ is held in suitable guides of any well-known or approved form and is operated by means of a toothed pinion I, the spindle of which, $i$, is provided with a squared end for the purpose of receiving a crank of any well-known or approved form for rotating it.

What I claim is—

1. A wagon-body, its supporting and running-gear frame, the side rails of the frame being rounded at their rear ends, push-bars pivotally secured at that portion of the body which last engages the tilting-point on the frame and having sliding engagements with the framework of the running-gear and means for operating the push-bars, substantially as set forth.

2. A wagon-body, its supporting and running-gear frame, a push-bar pivotally secured at that portion of the body which last engages the tilting-point on the frame and having a sliding engagement relatively to the supporting-frame and means for operating the push-bar, substantially as set forth.

MARTIN L. SENDERLING.

Witnesses:
FREDK. HAYNES,
IRENE B. DECKER.